(12) United States Patent
Barillaud

(10) Patent No.: US 6,646,996 B1
(45) Date of Patent: Nov. 11, 2003

(54) USE OF ADAPTIVE RESONANCE THEORY TO DIFFERENTIATE NETWORK DEVICE TYPES (ROUTERS VS SWITCHES)

(75) Inventor: Franck Barillaud, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,183

(22) Filed: Dec. 15, 1999

(51) Int. Cl.$^7$ ................................................ H04L 12/28
(52) U.S. Cl. ......................... 370/254; 370/255; 706/15
(58) Field of Search ................................. 370/254, 253, 370/252, 255, 466, 465, 464, 467, 468, 410, 401, 402; 707/227, 235, 224; 455/676; 706/15, 16, 25

(56) References Cited

U.S. PATENT DOCUMENTS

| | | | |
|---|---|---|---|
| 5,606,664 A | | 2/1997 | Brown et al. |
| 5,684,796 A | | 11/1997 | Abidi et al. |
| 5,710,885 A | | 1/1998 | Bondi |
| 5,727,157 A | | 3/1998 | Orr et al. |
| 5,751,964 A | | 5/1998 | Ordanic et al. |
| 5,822,535 A | | 10/1998 | Takase et al. |
| 5,845,277 A | | 12/1998 | Pfeil et al. |
| 5,848,243 A | | 12/1998 | Kulkarni et al. |
| 5,864,862 A | | 1/1999 | Kriens et al. |
| 5,926,463 A | * | 7/1999 | Ahearn ........................ 370/254 |
| 6,125,105 A | * | 9/2000 | Edwards ...................... 370/230 |
| 6,144,668 A | * | 11/2000 | Bass ............................ 370/401 |
| 6,216,163 B1 | * | 4/2001 | Bharali ........................ 709/227 |
| 6,377,987 B1 | * | 4/2002 | Kracht ......................... 709/220 |

OTHER PUBLICATIONS

James W. Hong, Michael A. Bauer and J. Michael Bennett, *The Role of Directory Services in Network Management*, Sep. 28, 1992, pp. 175–187.

IBM Technical Disclosure Bulletin, *Determination of Bandwidth and Latency in a Multimedia Communication Environment*, Feb. 1994, vol. 37 No. 02A, pp. 349–350.

Joonho Park, Brian W. O'krafka, Stamatis Vassiliadis and Jose Delgado–Frias, *Survey on Routers*, Apr. 1994.

IBM Technical Disclosure Bulletin, *Dynamic Determination of Network Topology*, Mar. 1995, vol. 38 No. 03, pp. 411–418.

Chung Sheng Li, Yoram Ofek and Moti Yung, *"Time–Driven Priority" Flow Control for Real–Time Heterogeneous Internetworking*, Aug. 3, 1995.

U.S. patent application Ser. No. 09/465,181, Anstey et al., filed Dec. 15, 1999.

U.S. patent application Ser. No. 09/465,183, Barillaud, filed Dec. 15, 1999.

* cited by examiner

Primary Examiner—Douglas Olms
Assistant Examiner—Ricardo M. Pizarro
(74) Attorney, Agent, or Firm—Marilyn Smith Dawkins; Bracewell & Patterson, L.L.P.

(57) ABSTRACT

To determine a network communications device type, (switch or router) without reference to internal information within the network communications device, two packets having preselected, differing sizes (e.g., 64 bytes and 1500 bytes) are sequentially transmitted from one network node to another through the network communications device. The difference between the transmission start times for the two packets, determined by time references set up based on internal data processing system high resolution counters and placed in the IP packet payload, and the difference between the receipt stop times—that is, when the last portions of the two packets are received—are compared. If the two differences are substantially the same, the network communications device is classified as a switch. If the two differences are unequal by an appreciable amount, the network communications device is classified as a router. Classification may optionally be performed by a neural network trained with the expect relative relationship between the transmission start times difference and the receipt stop times difference for the preselected packet sizes when transmitted through switches and routers.

21 Claims, 3 Drawing Sheets

USE OF ADAPTIVE RESONANCE THEORY TO DIFFERENTIATE NETWORK DEVICE TYPES (ROUTERS VS SWITCHES)

RELATED APPLICATIONS

The present invention is related to the subject matter of commonly assigned, copending United States patent applications: Ser. No. 09/465,181 entitled "USE OF GENERIC CLASSIFIERS TO DETERMINING PHYSICAL TOPOLOGY IN HETEROGENEOUS NETWORKING ENVIRONMENTS"; and Ser. No. 09/465,182 entitled "USE OF ADAPTIVE RESONANCE THEORY (ART) NEURAL NETWORKS TO COMPUTE BOTTLENECK LINK SPEED IN HETEROGENEOUS NETWORKING ENVIRONMENTS". The content of the above-identified applications are incorporated herein by reference.

BACKGROUND OF THE INVENTION

1. Technical Field

The present invention generally relates to characterization of network communications devices in a network and in particular to determining a network communications device type (switch vs. router). Still more particularly, the present invention relates to employing a neural network to determine a network communications device type from packet forwarding measurements.

2. Description of the Related Art

Computer networks are essential features of contemporary computing, providing the framework for exchange of data and execution of distributed applications, either through client-server interaction such as HyperText Transmission Protocol clients and servers or collaborative operation such as failover redundancy in highly available networks. In contemporary networking environments, most customers have a need to control the use of existing bandwidth so that network management traffic is not competing with the business traffic.

In order to minimize the potential negative impact of the management environment on the network infrastructure and performance, it is crucial that the management environment have information available regarding the underlying network topology. Through the utilization of such data, intelligent decisions may be made relevant to the design, implementation, and use of the management environment. In the network management field, there exists a strong need to have information regarding the physical network topology which is as accurate and detailed as possible to perform management tasks. For example, the process of distributing software to hundreds of workstations cannot be performed efficiently without an understanding of the physical topology.

Contemporary network communication devices are of two main types: networking devices that connect shared media (routers) and networking devices which connect dedicated media (switches). A mix of routing and switching network communication devices is not unusual, particularly in local area network (LAN) environments. Because the different manners in which these devices operate may have a dramatic impact on the performance of a management application, knowledge of the type of network communications device involved in performing the task is critical. Performance of communications between two nodes connected by a router is dependent on the existence and degree of traffic between other nodes through the router, while switch performance is essentially independent of traffic through the switch not involving the two nodes of interest.

Determining the underlying physical topology of a network is a non-trivial problem when the management application does not have access to the internal information (management information base or "MIB") of the network communication devices (as where the vendor-specific information is kept private or proprietary). Today most networking environments utilize not only private paths but also "public" paths such as portions of the Internet, for which the internal information of network communications devices are kept private or privileged for security purposes. While a network management application may have access to the internal information of network communication devices belonging to the enterprise running the network management application, it generally will not have access to such information for devices belonging to other enterprises.

It would be desirable, therefore, to be able to determine the type (switch vs. router) of a network communications device without relying on internal information from the network communications device. It would further be advantageous to be able to make the determination of the type of a network communications device quickly and utilizing as little computing resources as possible.

SUMMARY OF THE INVENTION

It is therefore one object of the present invention to provide an improved method, system, and computer program product for characterization of networking communications devices in a network.

It is another object of the present invention to provide an improved method, system, and computer program product for determining a network communications device type (switch vs. router).

It is yet another object of the present invention to employ a neural network to determine a network communications device type from packet forwarding measurements.

The foregoing objects are achieved as is now described. To determine a network communications device type (switch or router) without reference to internal information within the network communications device, two packets having preselected, differing sizes (e.g., 64 bytes and 1500 bytes) are sequentially transmitted from one network node to another through the network communications device. The difference between the transmission start times for the two packets, determined by time references set up based on internal data processing system high resolution counters and placed in the IP packet payload, and the difference between the receipt stop times—that is, when the last portions of the two packets are received—are compared. If the two differences are substantially the same, the network communications device is classified as a switch. If the two differences are unequal by an appreciable amount, the network communications device is classified as a router. Classification may optionally be performed by a neural network trained with the expect relative relationship between the transmission start times difference and the receipt stop times difference for the preselected packet sizes when transmitted through switches and routers.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects

DETAILED DESCRIPTION OF THE PREFERRED EMBODIMENT

Figure 1:
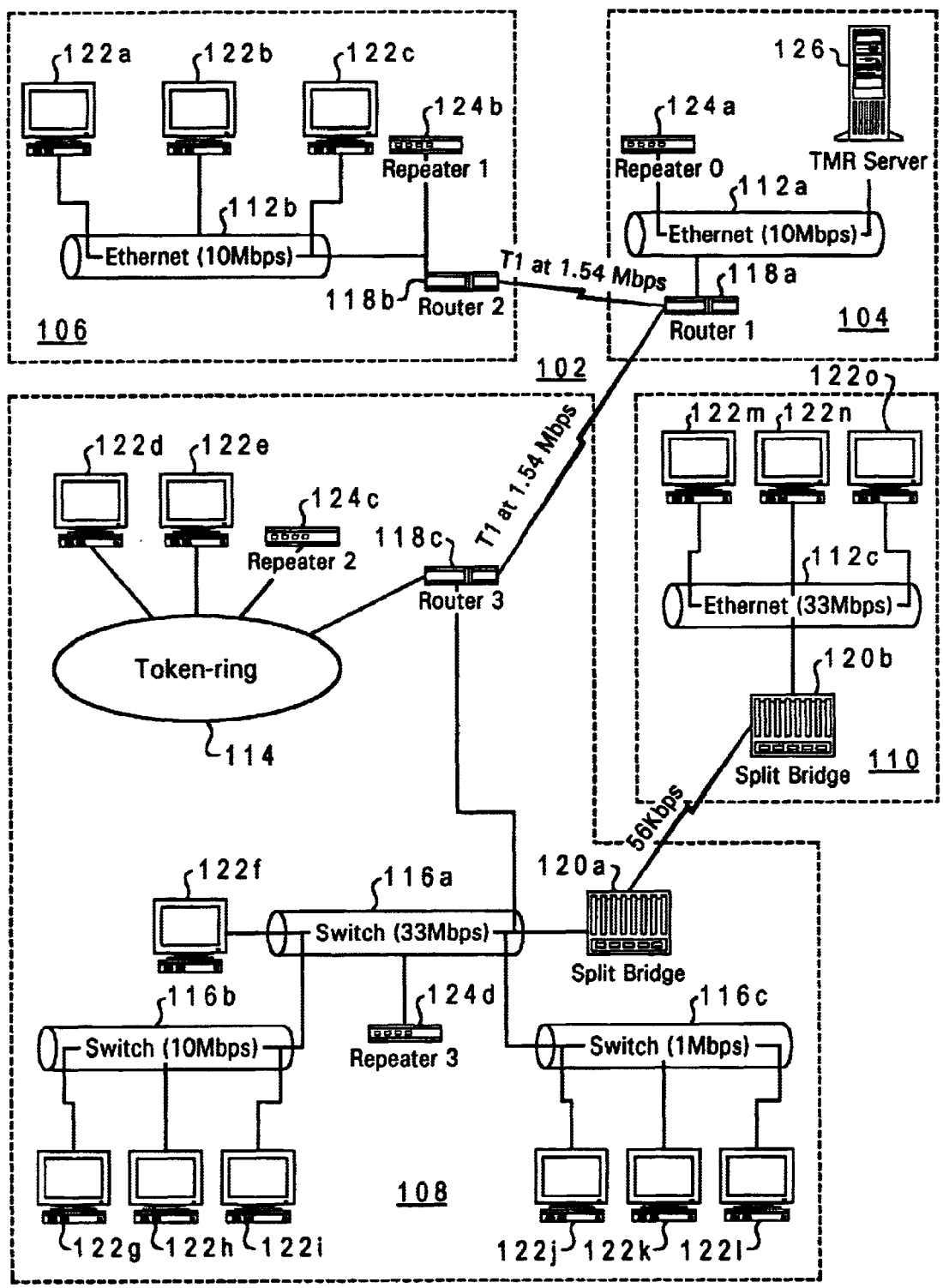
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 is a wide area network (WAN) or global area network (GAN) including a number of constituent local area networks (LANs) 104, 106, 108, and 110. In the exemplary embodiment, LAN 104 is located, for example, in Dallas, Tex., LAN 106 is located in Austin, Tex., LAN 108 is located in Raleigh, N.C., and LAN 110 is located in Durham, N.C.

Data processing system-network 102 is heterogenous, meaning that each component network 104, 106, 108, and 110 may employ a different "backbone" or communications protocol, and that communications between component networks 104, 106, 108, and 110 may utilize different forms and devices. In the exemplary embodiment, for instance, LANs 104, 106, and 110 each employ an Ethernet backbone 112a–112c, although with differing maximum data throughput rates, while LAN 108 employs both token ring and switched communications protocols 114 and 116a–116c, respectively. Additionally, LAN 104 communicates with LANs 106 and 108 utilizing routers 118a–118c, while LAN 108 communicates with LAN 110 utilizing a split bridge 120a–120b.

Executing within each of the data processing systems 122a through 122o in. data processing system network 102 may be a distributed computing environment and/or application (not shown), such as Tivoli Global Enterprise Manager (GEM) available from Tivoli Systems (www.tivoli.com). Such a distributed computing environment or application may provide enterprise asset management, network change (e.g., software updates) management, operations management, security and storage management, etc. A distributed computing environment and/or application of the type described requires information about physical network topology, particularly the network communications device type for devices connecting constituent components, in order to perform tasks in an efficient manner.

Figure 2:
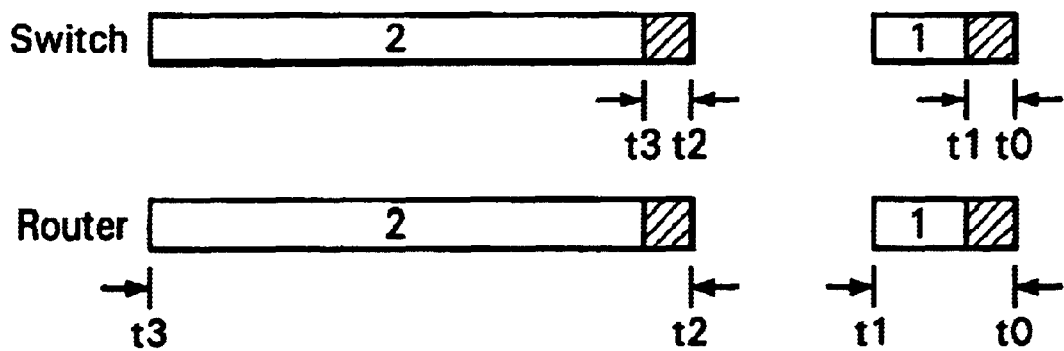
FIG. 2 is a diagram of a technique for determining a networking communications device type employed in a preferred embodiment of the present invention.

Referring to FIG. 2, which is intended to be read in conjunction with FIG. 1, a diagram of a technique for determining a networking communications device type employed in a preferred embodiment of the present invention is illustrated. In order to determine the type of communications device(s) between nodes of network 102, a packet delay timing technique is employed. Packet delay timing may be employed to identify network communications device type because the hardware architecture of switching devices and routing devices is different. Switches typically employed cut-through transmission, in which the switch does not need to wait for the entire frame or packet to arrive before beginning retransmission to the next node in the path between the source and destination nodes. Switches transmit the frame out of the destination port after receiving the destination address in the header, the first 64 bytes of the frame (illustrated as cross-hatched blocks in FIG. 2). Routers, on the other hand, generally implement a store-and-forward architecture, where the entire frame must first be received and a destination address looked up before retransmission out of the destination port can begin.

As a result of the differences in the underlying hardware architectures, network communications device types may be determined by transmitting two or more packets of differing sizes through the network communications device. The gap(s) between the two packets in crossing the network communications device may then be compared. As shown in FIG. 2, a transmission of a first frame to the network communications device is begun at time t0, and receipt of the frame begins at time t1 (the frame may be transmitted to a different node and either measured or echoed, or merely returned back to the originating node). Transmission of a second frame is begun at time t2, with the frame being received starting at time t3. The gap between the two packets or frames will remain constant when crossing a switch:

$$(t3-t1)=(t2-t0).$$

However, because of the different sizes of the packets, retransmission of the second packet will be delayed when crossing a router due to the time required for the router to read the entire packet:

$$(t3-t1)>(t2-t0).$$

The difference between forwarding times may thus be utilized to determine the nature or type of the network communications device. Depending on the transmission speeds and ratio of packet sizes, an inequality of about 2–5% or more would generally indicate that the network communications device is a router rather than a switch.

For instance, in determining the nature of a network communications device between server 126 and workstation 122f, pairs of packets of differing sizes may be transmitted by server 126 on LAN 112a to repeater 124a and returned, or to another node (not shown) within LAN 112a. The propagation delays of the packet pairs may then be compared. The transmission time is determined by time references set up based on internal data processing system high resolution counters and placed in the IP packet payload, and the time at which receipt of the packet was begun may be captured by the receiving node. Although the exemplary embodiment depicts transmitting a short packet before a long packet, the opposite sequence may also be employed. Data packet content is unimportant, and size differentials should preferably be preselected (e.g., 2:1 or greater size ratio for long:short packets). For instance, one packet may be 64 bytes (only a header) while the second packet may be 1500 bytes.

Figure 3:
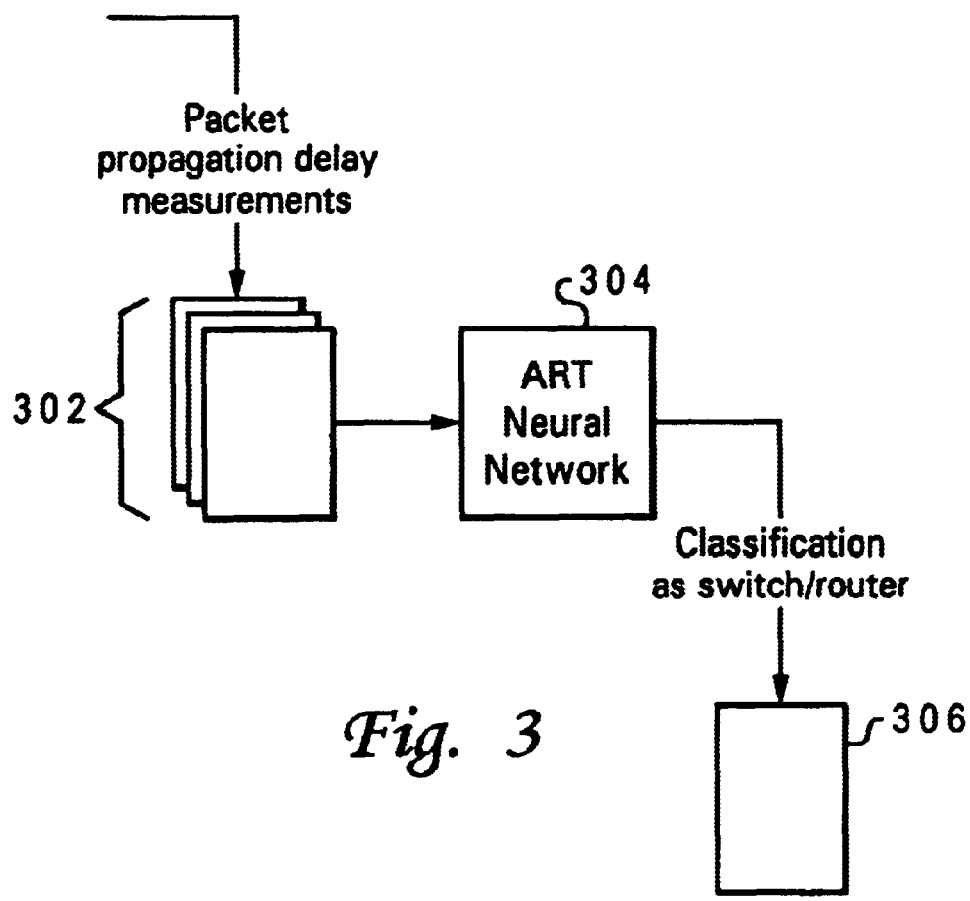
FIG. 3 depicts a block diagram of a mechanism for determining a determining network communications device type from data packet propagation delay measurements in accordance with a preferred embodiment of the present invention.

With reference now to FIG. 3, a block diagram of a mechanism for determining network communications device type from data packet propagation delay measurements in accordance with a preferred embodiment of the present invention is depicted. In the present invention, rather than utilizing statistical methods to analyze the data packet propagation delay measurements 302, a generic classifier such as a neural network is employed, preferably an adaptive resonance theory (ART) neural network 304.

ART neural networks are known in the art and available from several sources. ART neural networks are defined algorithmically in terms of detailed differential equations intended as plausible models of biological neurons. In practice, ART neural networks are implemented using analytical solutions or approximations to the differential equations. ART neural networks may be supervised or unsupervised, where unsupervised ART neural networks are basically similar to many-iterative clustering algorithms in which each case is processed by finding the "nearest" cluster seed (i.e., prototype or template) to that case, then updating that cluster seed to be "closer" to the subject case, where "nearest" and "closer" may be defined in a variety of different manners.

In ART neural networks, however, this framework is slightly modified by introducing the concept of "resonance", so that each case is processed by finding the "nearest" cluster seed which "resonates" with that case, then updating that cluster seed to be "closer" to the subject case. The term "resonance" refers to the so called resonant state of the neural network in which a category prototype vector matches the current input vector close enough so the orienting subsystem will not generate a reset signal. In this case, the activity pattern causes the same node to be selected, which in turn sends the same prototype vector, which again matches the current input close enough, and so on. The neural network learns only in its resonant state. ART neural networks are capable of developing stable clusterings of arbitrary sequences of input patterns by self-organization. In general, the output of an ART neural network would be of the form:

| Node | Class |
|------|-------|
| A | 1 |
| B | 1 |
| C | 2 |
| D | 2 |
| E | 3 |
| F | 1 |
| G | 3 |
| H | 4 |

These results indicate that nodes A, B and F belong to the same class, nodes C and D belong to a different class, and nodes E and G belong to a third class, while node H belongs to its own class. With the context of the present invention, the different classes may be interpreted as representing different well-known, existing network speeds. The ART neural network 304 thus correlates data packet propagation delays with expected delays corresponding to routers and switches.

With the statistical analysis methods of the prior art, extensive computing is required after each sequence of data packet propagation delay measurements. With the present invention, however, the neural network may be trained before the data packet propagation delay measurements are made. The measurements are then input into the neural network to determine the network communications device type. The time required to determine bottleneck link speed from a sequence of measurements is reduced, as most of the processing may be performed before any measurements are made. Additionally, a substantially smaller set of measurements will suffice to accurately determine bottleneck link speed due to the resonant quality of the neural network. The neural network is trained utilizing the expected data packet propagation delays for switches and routers as a template for the known network communications devices and preselected packet sizes, before the software which will employ the present invention is distributed.

Figure 4:
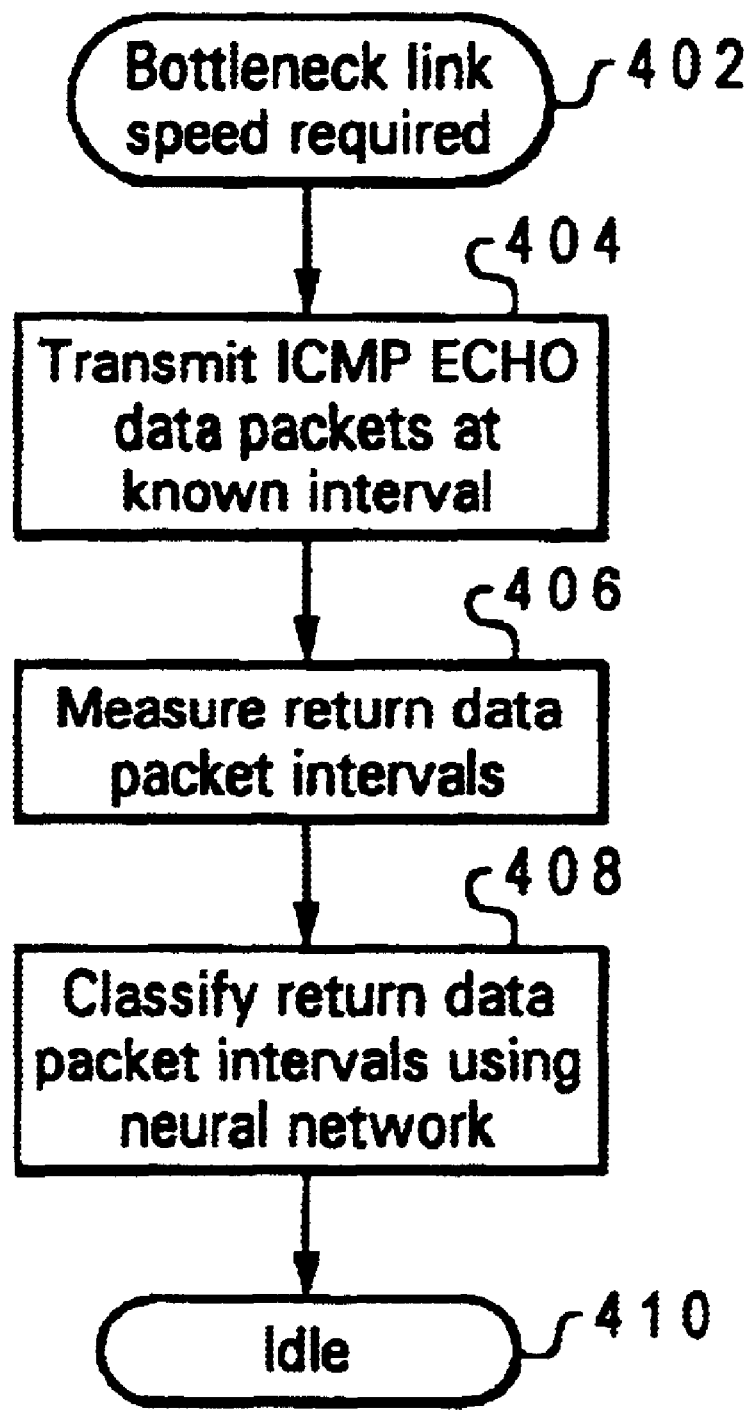
FIG. 4 is a high level flowchart for a process of determining a determining network communications device type from data packet propagation delay measurements in accordance with a preferred embodiment of the present invention.

Referring to FIG. 4, a high level flowchart for a process of determining network communications device type from data packet propagation delay measurements in accordance with a preferred embodiment of the present invention is illustrated. The process begins at step 402, which depicts a network communications device type being required. The process first passes to step 404, which illustrates transmitting a sequence of data packets having differing sizes from one of the network nodes to another through the subject network communications device. The process then passes to step 406, which depicts determining the interval between transmission start times for the node transmitting the packets, which should be included in the packet payload, and the interval between the transmission or receipt stop times (the time when the last portion of each packet was received at the receiving node), then determining a difference between the transmission start times and the receipt stop times.

The process next passes to step 408, which illustrates classifying the network communications device using the difference between the transmission start times and the receipt stop times, which should be approximately zero for switches and non-zero for routers, utilizing a neural network trained with the expected differences for routers and switches given the preselected packet sizes. The resulting classification will be the network communications device type of the device between the two nodes. The process then passes to step 410, which depicts the process becoming idle until another network communications device type is required.

One advantage of the present invention is that it may be employed in conjunction with a process for determining physical network topology as described in the related applications. The ART neural network employed for determining network communications device type speed may be one of several neural network utilized to characterize the physical network topology. Additionally, because neural networks are fault tolerant, a large set of samples is not require to accurately determine network communications device type. One pair of transmission start times and receipt stop times for packets having the preselected, differing sizes should be sufficient. Absolutely no internal information from the switch or router is required to determine the communications device types.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of determining a device type, comprising:
   transmitting two data packets having preselected, differing sizes through a network communications device;
   determining propagation delay times for the two data packets for propagation of the two packets through the network communications device; and
   determining whether the network communications device is a switch or a router utilizing the propagation delay times.

2. The method of claim 1, wherein the step of determining propagation delay times for the two data packets for propagation of the two packets through the network communications device further comprises:
   determining a difference in transmission start times for the two data packets; and
   it determining a difference in receipt stop times for the two data packets.

3. The method of claim 2, wherein the step of determining a difference in transmission start times for the two data packets further comprises:
   determining the difference in transmission start times from packet payload information for the two data packets.

4. The method of claim 2, wherein the step of determining whether the network communications device is a switch or a router utilizing the propagation delay times further comprises:
   comparing the difference in transmission start times to the difference in receipt stop times;
   identifying the network communications device as a switch if the difference in transmission start times is approximately equal to the difference in receipt stop times; and
   identifying the network communications device as a router if the difference in transmission start times is appreciably different than the difference in receipt stop times.

5. The method of claim 1, wherein the step of transmitting two data packets having preselected, differing sizes through a network communications device further comprises:
   transmitting a 64 byte data packet and a 1500 byte data packet from a first node to a second node through the network communications device.

6. The method of claim 1, wherein the step of determining whether the network communications device is a switch or a router utilizing the propagation delay times further comprises:
   utilizing a neural network to classify the network communications device as a switch or a router based on the propagation delay times.

7. The method of claim 6, wherein the step of utilizing a neural network to classify the network communications device as a switch or a router based on the propagation delay times further comprises:
   classifying the network communications device as a switch if the propagation delay times are substantially equal; and
   classifying the network communications device as a router if the propagation delay times are appreciably different.

8. A system for determining a device type, comprising:
   means for transmitting two data packets having preselected, differing sizes through a network communications device;
   means for determining propagation delay times for the two data packets for propagation of the two packets through the network communications device; and
   means for determining whether the network communications device is a switch or a router utilizing the propagation delay times.

9. The system of claim 8, wherein the means for determining propagation delay times for the two data packets for propagation of the two packets through the network communications device further comprises:
   means for determining a difference in transmission start times for the two data packets; and
   means for determining a difference in receipt stop times for the two data packets.

10. The system of claim 9, wherein the means for determining a difference in transmission start times for the two data packets further comprises:
    means for determining the difference in transmission start times from packet payload information for the two data packets.

11. The system of claim 9, wherein the means for determining whether the network communications device is a switch or a router utilizing the propagation delay times further comprises:
    means for comparing the difference in transmission start times to the difference in receipt stop times;
    means for identifying the network communications device as a switch if the difference in transmission start times is approximately equal to the difference in receipt stop times; and
    means for identifying the network communications device as a router if the difference in transmission start times is appreciably different than the difference in receipt stop times.

12. The system of claim 8, wherein the means for transmitting two data packets having preselected, differing sizes through a network communications device further comprises:
    means for transmitting a 64 byte data packet and a 1500 byte data packet from a first node to a second node through the network communications device.

13. The system of claim 8, wherein the means for determining whether the network communications device is a switch or a router utilizing the propagation delay times further comprises:
    means for utilizing a neural network to classify the network communications device as a switch or a router based on the propagation delay times.

14. The system of claim 13, wherein the means for utilizing a neural network to classify the network communications device as a switch or a router based on the propagation delay times further comprises:
    means for classifying the network communications device as a switch if the propagation delay times are substantially equal; and
    means for classifying the network communications device as a router if the propagation delay times are appreciably different.

15. A computer program product within a computer usable medium for determining a device type, comprising:
    instructions for transmitting two data packets having preselected, differing sizes through a network communications device;

instructions for determining propagation delay times for the two data packets for propagation of the two packets through the network communications device; and instructions for determining whether the network communications device is a switch or a router utilizing the propagation delay times.

16. The computer program product of claim 15, wherein the instructions for determining propagation delay times for the two data packets for propagation of the two packets through the network communications device further comprise:

instructions for determining a difference in transmission start times for the two data packets; and instructions for determining a difference in receipt stop times for the two data packets.

17. The computer program product of claim 16, wherein the instructions for determining a difference in transmission start times for the two data packets further comprise:

instructions for determining the difference in transmission start times from packet payload information for the two data packets.

18. The computer program product of claim 16, wherein the instructions for determining whether the network communications device is a switch or a router utilizing the propagation delay times further comprise:

instructions for comparing the difference in transmission start times to the difference in receipt stop times;

instructions for identifying the network communications device as a switch if the difference in transmission start times is approximately equal to the difference in receipt stop times; and instructions for identifying the network communications device as a router if the difference in transmission start times is appreciably different than the difference in receipt stop times.

19. The computer program product of claim 15, wherein the instructions for transmitting two data packets having preselected, differing sizes through a network communications device further comprise:

instructions for transmitting a 64 byte data packet and a 1500 byte data packet from a first node to a second node through the network communications device.

20. The computer program product of claim 15, wherein the instructions for determining whether the network communications device is a switch or a router utilizing the propagation delay times further comprise:

instructions for utilizing a neural network to classify the network communications device as a switch or a router based on the propagation delay times.

21. The computer program product of claim 20, wherein the instructions for utilizing a neural network to classify the network communications device as a switch or a router based on the propagation delay times further comprise:

instructions for classifying the network communications device as a switch if the propagation delay times are substantially equal; and instructions for classifying the network communications device as a router if the propagation delay times are appreciably different.

* * * * *